United States Patent [19]

Priem

[11] Patent Number: 5,687,357
[45] Date of Patent: Nov. 11, 1997

[54] REGISTER ARRAY FOR UTILIZING BURST MODE TRANSFER ON LOCAL BUS

[75] Inventor: Curtis Priem, Fremont, Calif.

[73] Assignee: Nvidia Corporation, Sunnyvale, Calif.

[21] Appl. No.: 422,355

[22] Filed: Apr. 14, 1995

[51] Int. Cl.$^6$ .............................. G11C 7/00; G06F 13/28
[52] U.S. Cl. ................ 395/515; 395/280; 395/855; 395/854; 395/853; 395/501; 395/509
[58] Field of Search .................................. 395/280, 853, 395/854, 855, 850, 800, 501, 131, 585, 509, 555, 515

[56] References Cited

U.S. PATENT DOCUMENTS 5,400,288   3/1995   Hashimoto et al. .

Primary Examiner—Jack B. Harvey
Assistant Examiner—Rupal D. Dharia
Attorney, Agent, or Firm—Stephen L. King

[57] ABSTRACT

Apparatus and a method by which an application program writing a series of commands to a single destination on an input/output bus increments the addresses to which the commands are addressed as the commands are written so that the commands may be transferred utilizing the burst mode of the input/output bus, and the device receiving the data decodes a large number of sequential addresses to the same destination so that the input/output device transfers all of the commands in the sequence of addresses to the single destination.

8 Claims, 2 Drawing Sheets

5,687,357

REGISTER ARRAY FOR UTILIZING BURST MODE TRANSFER ON LOCAL BUS

BACKGROUND OF THE INVENTION

1. Field of the Invention

This invention relates to computer circuitry and, more particularly, to apparatus and a method for providing a substantial increase in the speed of operation on computer buses which provide burst mode transfers.

2. History of the Prior Art

Computer systems transfer data over buses between processors, memory, and various input/output devices. More advanced computer buses such as the peripheral component interface (PCI) bus allow a "burst mode" of transfer in which a plurality of words of data may be transferred to sequential addresses more rapidly than in other transfer modes. These burst transfers are typically used to transfer data to refill cache lines in a processor cache since cache lines of necessity consist of a block of sequential addresses. This allows data to be rapidly transferred to a cache and reduces processor memory access time. Burst mode offers much more rapid transfers of data when applicable and helps increase processing speed.

However, there are many situations in which large amounts of data must be transferred to devices such as input/output devices yet the data is not addressed to sequential addresses. Such a situation may arise when a string of data is addressed to a single register on a graphics controller in order to provide data for drawing images to be displayed on an output display monitor. For example, when drawing a polyline, an application program typically causes the central processing unit to write a series of line end points to a single register on a graphics control device. Since these end points are sent to the same register, the address is always the same. Consequently, this transfer may not utilize burst mode for transfers on an input/output bus such as the PCI bus. Although copious amounts of data may have to be transferred in a continuous stream to accomplish such an operation, each transfer is to the same address so that the burst mode of the bus is not available to transfer the data more rapidly.

It is very desirable to be able to utilize burst mode for transfers of large amounts of data even though the words of data are not transferred to sequential addresses.

SUMMARY OF THE INVENTION

It is, therefore, an object of the present invention to provide apparatus and a method for broadening the range of conditions in which burst mode transfers may be utilized.

It is another object of the present invention to provide apparatus and a method for utilizing the burst transfer mode of advanced input/output buses to transfer a series of data words to a single destination.

These and other objects of the present invention are realized by an apparatus and a method by which an application program writing a series of commands to a single destination on an input/output bus increments the addresses to which the commands are addressed as the commands are written so that the commands may be transferred utilizing the burst mode of the input/output bus, and the device receiving the commands decodes a large number of sequential addresses to the same destination so that the input/output device transfers all of the commands in the sequence of addresses to the single destination. In this way, all of the commands transferred to the sequential addresses of what appears to be an array at the destination may be sent to the same destination in sequential order.

These and other objects and features of the invention will be better understood by reference to the detailed description which follows taken together with the drawings in which like elements are referred to by like designations throughout the several views.

NOTATION AND NOMENCLATURE

Some portions of the detailed descriptions which follow are presented in terms of symbolic representations of operations on data bits within a computer memory. These descriptions and representations are the means used by those skilled in the data processing arts to most effectively convey the substance of their work to others skilled in the art. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary or desirable in most cases in any of the operations described herein which form part of the present invention; the operations are machine operations. Useful machines for performing the operations of the present invention include general purpose digital computers or other similar devices. In all cases the distinction between the method operations in operating a computer and the method of computation itself should be borne in mind. The present invention relates to a method and apparatus for operating a computer in processing electrical or other (e.g. mechanical, chemical) physical signals to generate other desired physical signals.

DETAILED DESCRIPTION

Figure 1:
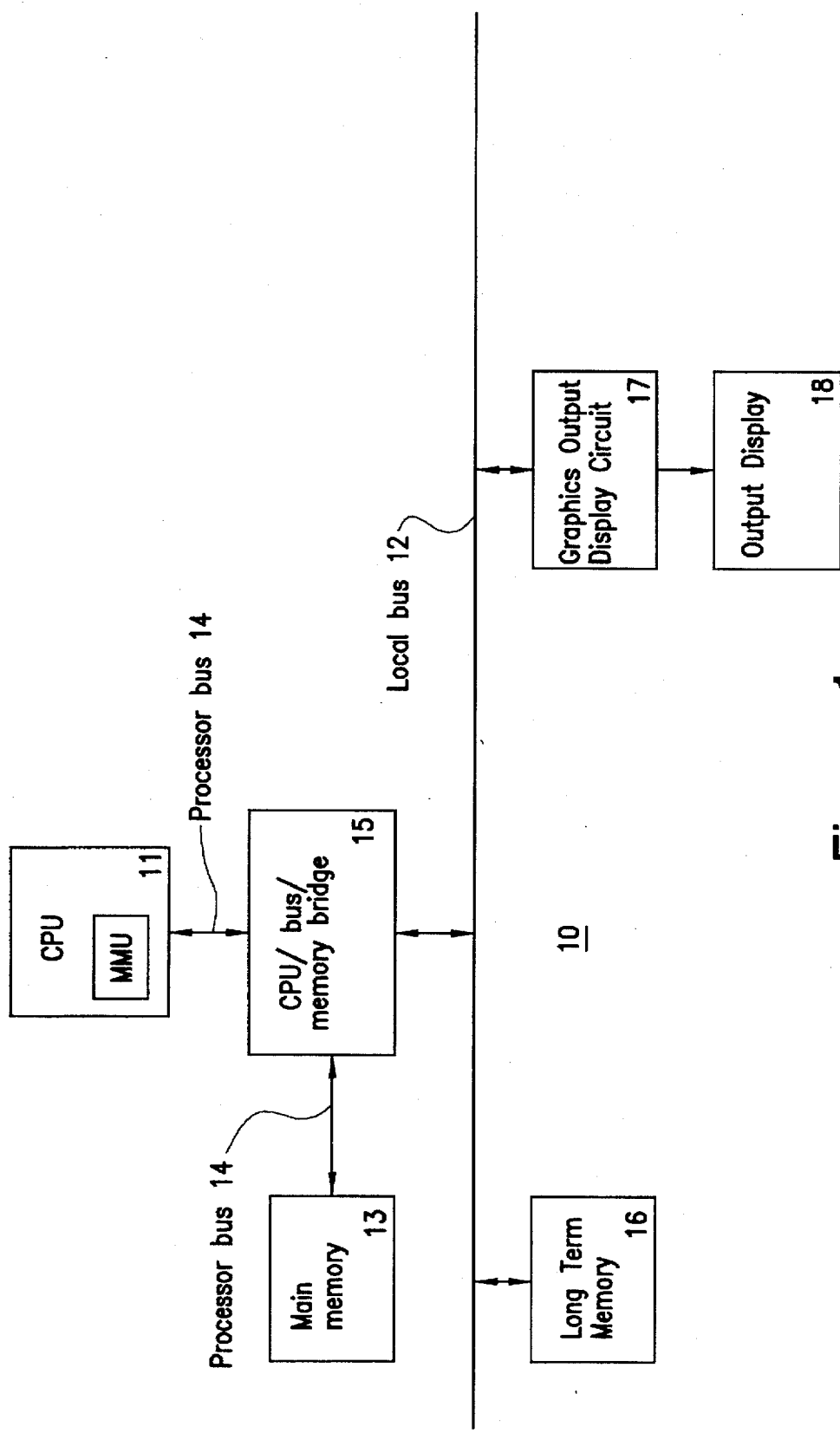
FIG. 1 is a block diagram of a computer system which may utilize the present invention.

Referring now to FIG. 1, there is illustrated a block diagram of a computer system 10 which may be configured to utilize the present invention. Such a system 10 includes a central processing unit 11 which executes the various instructions provided to control the operations of the system 10. The central processing unit 11 is joined to a bus 12 adapted to carry information between the various components of the system 10. The present invention is arranged to function with a local bus 12 such as the Peripheral Component Interconnect (PCI) bus or the Video Electronics Standards Association (VESA) local bus which provides a burst mode of transfer. The discussion of this particular figure will assume that the local bus 12 is a PCI bus. In such arrangements, the central processing unit 11 and main memory 13 are typically arranged on a processor bus 14 and are joined to a bridge unit 15. Main memory 13 is typically constructed of dynamic random access memory arranged in a manner well known to those skilled in the prior art to store information during a period in which power is provided to the system 10. The central processing unit 11 typically includes a memory management unit. The bridge unit 15 provides write buffering for operations between the central processing unit 11 and the local bus 12, between the central processing unit 11 and main memory 13, and between the local bus 12 and main memory 13.

Also connected to the bus 12 are various peripheral components such as long term memory 16 and circuitry such as graphics output display circuit 17 which may include a frame buffer to which data may be written which is to be transferred to an output display device 18 such as an output display monitor.

Figures 2, 3:
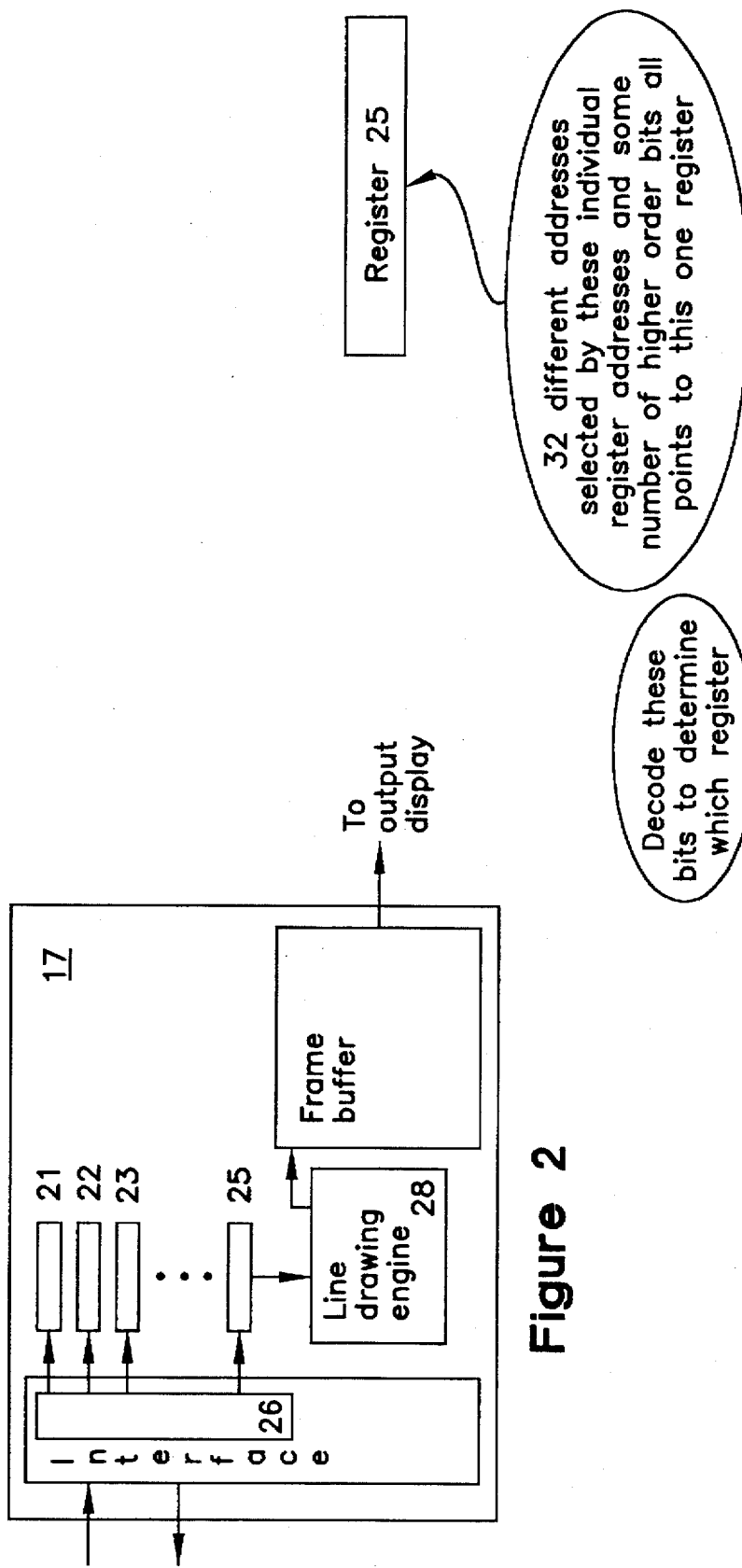
FIG. 2 is a portion of a block diagram of a particular input/output device which may utilize the present invention.
FIG. 3 is a diagram illustrating an addressing scheme which may be utilized to achieve the advantages of the present invention.

A graphics output display circuit 17 such as that illustrated in FIG. 2 typically provides a series of registers by which communication with other devices on the bus 12 such as the central processing unit is implemented. For example, an application program running on the central processing unit 11 writes data to the graphics output display circuit 17 by addressing particular ones of the registers 21-25 and additional registers which may be a part of the circuit 17 and transferring data to or from those registers. The circuit 17 utilizes the data in the registers 21-25 to accomplish its various tasks such as storing data in a frame buffer which will ultimately describe a line on an output display device 18.

The manner in which a particular graphics element such as a polyline is typically described on the output display is as follows. The application program first writes a command to the graphics circuit 17 indicating that it desires to draw a polyline on the display. This command is addressed to a particular register on the circuit 17 and includes data defining a first point on the polyline. The circuit 17 decodes the command and proceeds to transfer the data to the particular addressed register which is utilized to store points on the polyline being described. The first command is followed by a series of subsequent commands addressed to the same register defining additional points on the polyline. These points are used to generate pixel data which is transferred to a frame buffer which may be a part of the circuit 17 and ultimately scanned to the output display device 18. In a specific instance, the application program begins by sending a first point to a data register (for example, register 25) at a particular address which is decoded by the address decoding circuitry 26 of the circuit 17. The circuit 17 utilizes the data in the register to describe the first point of a line segment. The application program continues with a series of additional points each of which is typically addressed to the same data register and includes data defining additional points on the polyline. The data placed in the register is then typically sent to a hardware line drawing engine 28 of the circuit 17. The line drawing engine utilizes the sequential points furnished to derive very rapidly the position and color of the pixels defining the individual line segments joining the pairs of points. This pixel data is furnished to the frame buffer to be scanned to the display.

Because the data describing each of these end points is sent to the same register, it is addressed to the same address in prior art systems. Consequently, the typical computer is unable to utilize its bus burst transfer mode in order to accelerate the transfer of the data describing the end points even though the data appears in sequence and may be very rapidly handled by the circuit 17. This means that each step of the transfer is quite time consuming.

The present invention overcomes this limitation of the prior art and allows a device to receive data transferred to a single address using the bus burst transfer mode. This is accomplished by causing the decoding circuitry 26 to decode a series of sequential addresses to the same register (such as register 25) or similar device for receiving data (such as the input to a FIFO circuit). Presuming that a single data register is provided for receiving data such as the end point data defining a polyline discussed above, if the application program transfers a series of commands to sequential addresses, for example, thirty-two addresses, and if these commands are then decoded to the same register, then an application program may transfer data sequentially to that series of addresses knowing that the data will all be transferred ultimately to the same register. If the decoding circuit 26 of the input/output device decodes a series of addresses for the same register (or other storage element), the register appears to the bus and the operating system to be a register (or destination) array having a series of addresses to which data may be sent. If the bus is operated in burst transfer mode and a series of data is sent to the sequential addresses which the decoding circuit 26 sends to the register 25, then the data may be transferred in burst transfer mode.

There are two requirements for this to happen. First the application programmer must direct the commands in the series of data to sequential addresses rather than to a single register address even though the programmer knows that the data is, in fact, to be transferred to a single physical register (or other single destination). Second, the decoding circuitry of the receiving device must decode all of the series of addresses to the same register or other single device for utilizing the data. The decoding circuitry may accomplish this decoding very simply by ignoring some number of lower order bit positions in the address to which the data is directed. For example, as shown in FIG. 3, when data is transferred to a thirty-two bit address and the lowest bits determine the address of register within the input/output device of which the register is a part, the lower two bits of the address are typically ignored since they indicate byte positions within the thirty-two bits. By ignoring the five next highest lower order bits, thirty-two sequential addresses may be decoded by the decoding circuit input/output device for the same destination. Thus, a series of thirty-two individual words of data may be transferred to sequential addresses and actually received at the same register for utilization.

FIG. 3 illustrates a decoder which is devised to accomplish the decoding of a series of addresses to the same position within an input/output device such as a graphics controller. In the example, the decode circuit 26 decodes each of a sequence of addresses from 110100011 11010001 10001110 00000XX to 110100011 11010001 10001110 11111XX decode to the same register 25.

It will be under stood by those skilled in the art that the present invention provides a very substantial increase in speed of various operations on a computer bus which includes a burst transfer mode of operation. In fact, it has been estimated that speed increases of approximately twenty-three percent may be realized by utilizing the apparatus and method of the present invention.

Although the present invention has been described in terms of a preferred embodiment, it will be appreciated that various modifications and alterations might be made by those skilled in the art without departing from the spirit and scope of the invention. The invention should therefore be measured in terms of the claims which follow.

What is claimed is:

1. A method for decoding addresses on a bus which provides a burst transfer mode which may be utilized for rapidly transferring commands to sequential addresses, the method including the steps of:

addressing a sequence of commands intended for the same address to a sequence of serial addresses, transferring the commands on the bus utilizing the burst transfer mode, and decoding all of the serial sequence of commands to the same destination.

2. Apparatus for rapidly transferring commands to a single address in a computer system comprising:

a bus utilizing a burst transfer mode in which commands are addressed to a serial sequence of addresses, and decoding circuitry decoding all of a serial sequence of commands to the same destination.

3. Apparatus for rapidly transferring commands to a single address in a computer system as claimed in claim 2 in which the destination is a FIFO circuit.

4. Apparatus for rapidly transferring commands to a single address in a computer system as claimed in claim 2 in which the destination is a register.

5. Apparatus for rapidly transferring commands to a single address in a computer system as claimed in claim 2 in which the decoding circuitry is a part of an input/output device.

6. A computer system comprising a central processing unit;

a bus utilizing a burst transfer mode in which commands are addressed to a serial sequence of addresses;

main memory; and an input/output circuit including decoding circuitry decoding all of a serial sequence of commands to the same destination.

7. A computer system as claimed in claim 6 in which the destination is a FIFO circuit.

8. A computer system as claimed in claim 6 in which the destination is a register.

* * * * *